United States Patent
Asada

(10) Patent No.: US 7,391,186 B2
(45) Date of Patent: Jun. 24, 2008

(54) VEHICLE ALTERNATOR MONITORING SYSTEM AND RELATED FAILURE MONITORING METHOD

(75) Inventor: Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 85 days.

(21) Appl. No.: 11/528,342

(22) Filed: Sep. 28, 2006

(65) Prior Publication Data

US 2007/0085510 A1    Apr. 19, 2007

(30) Foreign Application Priority Data

Oct. 17, 2005    (JP) .............................. 2005-301558

(51) Int. Cl.
*H02J 7/14* (2006.01)
(52) U.S. Cl. .............................. 322/28; 322/25; 322/99
(58) Field of Classification Search .................. 322/22, 322/23, 25, 28, 36, 37, 99
See application file for complete search history.

(56) References Cited

U.S. PATENT DOCUMENTS

| | | | | |
|---|---|---|---|---|
| 4,315,204 | A * | 2/1982 | Sievers et al. .................. | 322/28 |
| 4,348,629 | A * | 9/1982 | Sievers ........................ | 322/99 |
| 5,122,723 | A * | 6/1992 | Sato ............................ | 320/123 |
| 5,157,610 | A | 10/1992 | Asano et al. | |
| 5,629,606 | A | 5/1997 | Asada | |
| 5,767,636 | A | 6/1998 | Kanazawa et al. | |
| 5,907,233 | A * | 5/1999 | Jabaji .......................... | 322/28 |
| 6,184,661 | B1 * | 2/2001 | Becker et al. .................. | 322/25 |
| 7,285,938 | B2 * | 10/2007 | Aoyama ....................... | 322/28 |

FOREIGN PATENT DOCUMENTS

| | | |
|---|---|---|
| CN | 1131838 A | 9/1996 |
| JP | B2 3505882 | 12/2003 |
| JP | B2 3531771 | 3/2004 |

* cited by examiner

*Primary Examiner*—Nicholas Ponomarenko
(74) *Attorney, Agent, or Firm*—Oliff & Berridge, PLC

(57) ABSTRACT

A vehicle alternator failure monitoring system and related monitoring method are disclosed wherein an ECU executes operations depending on a power generation status of a vehicle alternator and a vehicle alternator control device has a serial communication transmitter circuit operative to transmit a serial communication signal, indicative of the power generation status of the vehicle alternator, to the ECU. The serial communication transmitter circuit has a first power generation status signal transmission mode in which a first power generation status signal, representing the power generation status, is transmitted together with a failure flag representing the presence of or absence of an operational failure, related to the vehicle alternator, and a second power generation status signal transmission mode in which a second power generation status signal, representing the power generation status, is transmitted together with additional data representing an operational state of the vehicle alternator.

19 Claims, 8 Drawing Sheets

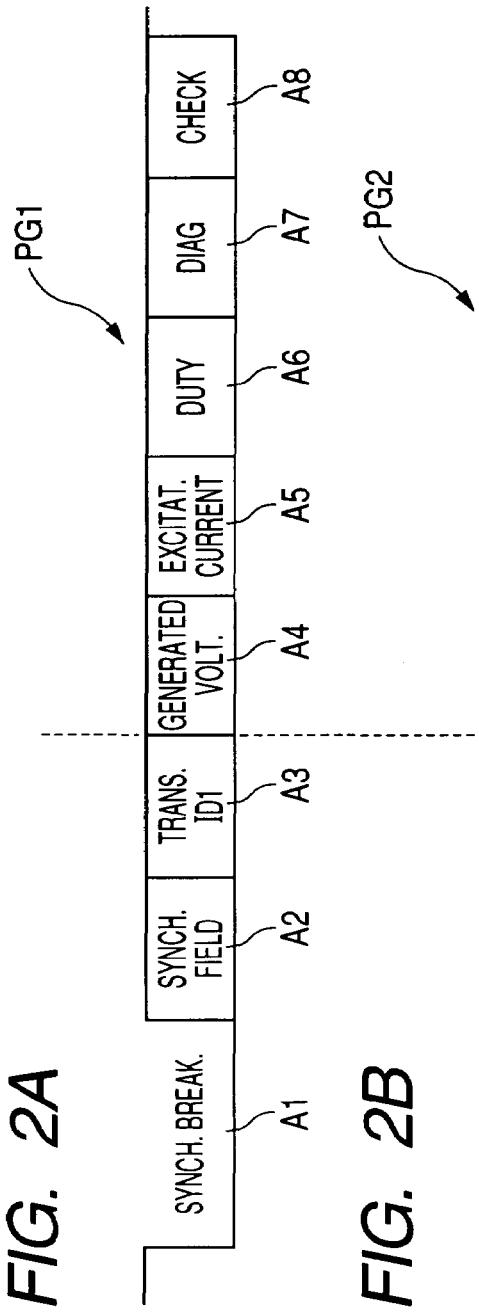
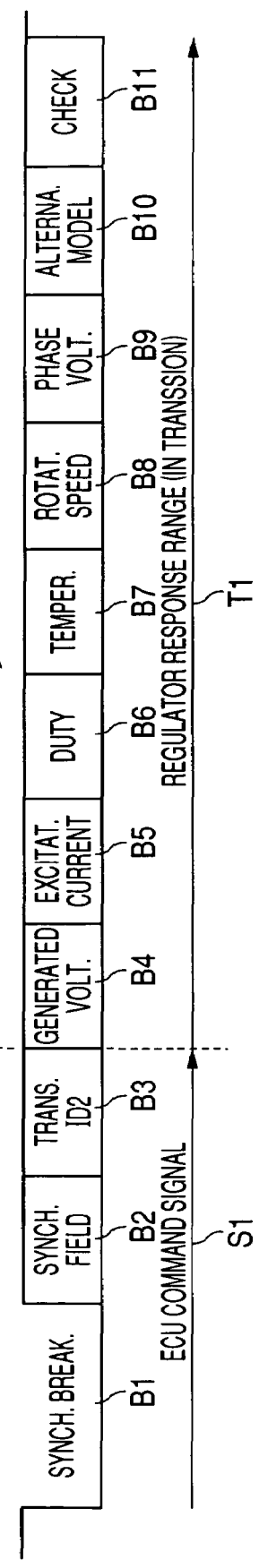
FIG. 2A
FIG. 2B

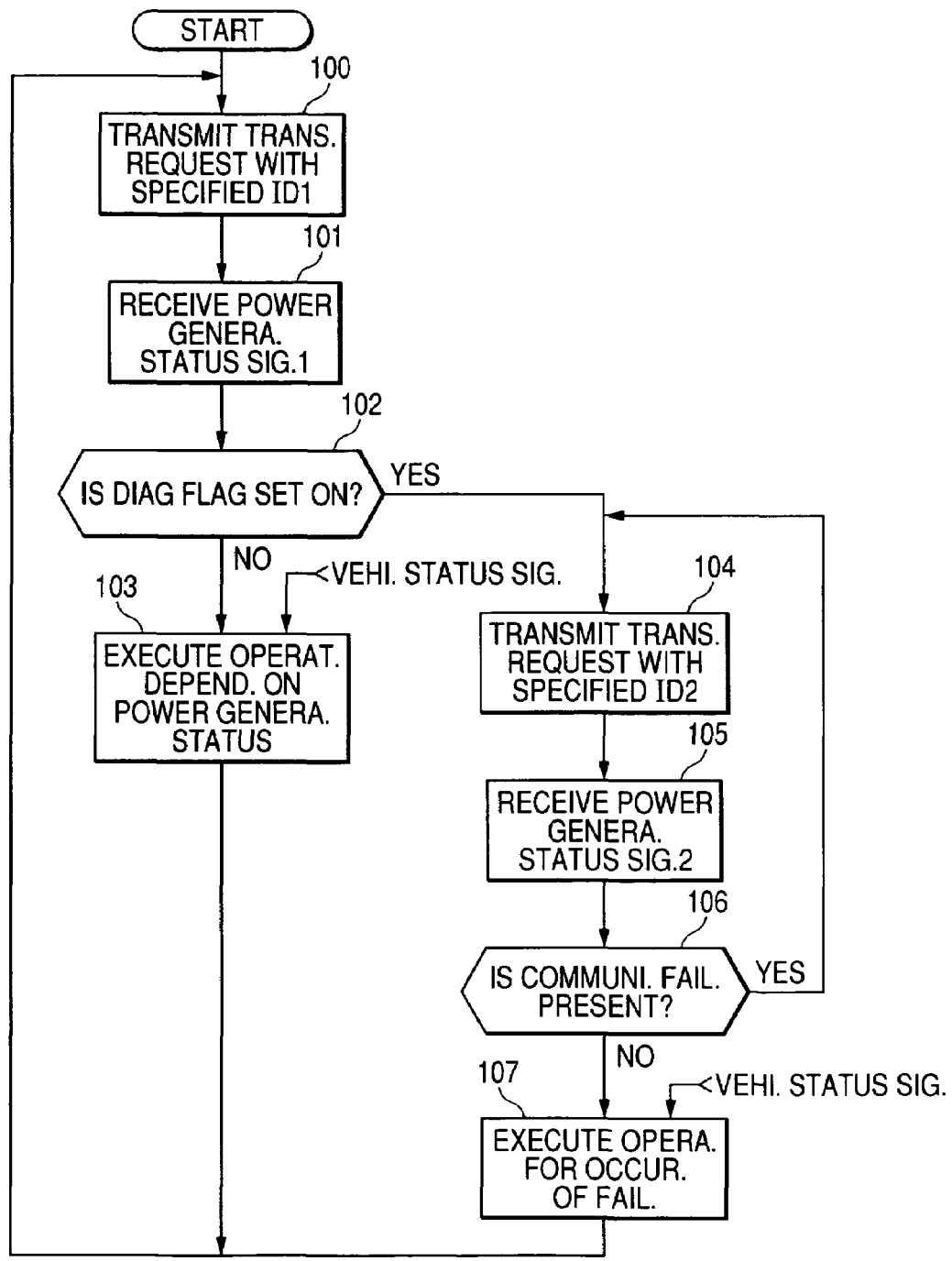

VEHICLE ALTERNATOR MONITORING SYSTEM AND RELATED FAILURE MONITORING METHOD

CROSS REFERENCE TO RELATED APPLICATIONS

This application is based on Japanese Patent Application No. 2005-301558 filed on Oct. 17, 2005, the content of which is hereby incorporated by reference.

BACKGROUND OF THE INVENTION

1. Technical Field of the Invention

The present invention relates to vehicle alternator failure monitoring systems and related monitoring methods and, more particularly, to a vehicle alternator failure monitoring system and related monitoring method for monitoring a power generation status and power generation failure of the vehicle alternator.

2. Description of the Related Art

Among control devices of the related art vehicle alternators, attempt has heretofore been made to provide a control device that, with a view to initiating rapid charging of a battery, performs power regulation control so as to maintain a power output of a vehicle operator at a fixed level (of, for instance, of 14.5V) that is fairly higher than a battery open terminal voltage (of, for instance, of 12.8V). Such a control device is configured to variably regulate a control voltage of the vehicle alternator in an appropriate fashion depending on a running state of a vehicle based on power generation control parameters delivered from an external control device (see for instance Japanese Patent No. 3505882 on pages 5 to 12 and FIGS. 1 to 31).

Further, another attempt has been made to provide a technology in which control parameters are transmitted from an external control device to a vehicle alternator in PWM communication using one communication line through which a power generation status signal is transmitted from the vehicle alternator to the external control device (see for instance Japanese Patent No. 3531771 on pages 5 to 11 and FIGS. 1 to 10). Also, as one of protocols in serial communication, a LIN (Local Area Network)) protocol has been proposed.

By the way, the use of serial communication results in capability of increasing an amount of information for an object to be transmitted and received and monitoring a detailed power generation status. However, if attempt is made to allow the external control device to process power generation information having an increase in a rarely distributed failure status of the vehicle alternator, the external control device has an inordinate processing burden, resulting in the occurrence of an issue with a fear of deterioration on control performance of a whole of a vehicle.

Further, a failure state of the vehicle alternator involves a temporary voltage drop resulting form power-on operation of, for instance, a large electrical load. Under such a condition, even if the temporary drop occurs in an output voltage of the vehicle alternator, the output voltage rises again when the electrical load is turned off or when a power generation rate increases due to traveling of the vehicle. In such a case, it is nothing to get alarmed by turning on a warning lamp to provide a vehicle driver with warning notification. Thus, with no judgment made in taking not only an operational status of the vehicle alternator but also a vehicle status into consideration in an integrated way, undesired warning is provided to the vehicle driver accompanied by promoted uneasy feeling.

SUMMARY OF THE INVENTION

The present invention has been completed with a view to addressing the issues mentioned above and has an object to a vehicle alternator failure monitoring system and related monitoring method that make it possible to obtain detailed information related to an operational failure status of a vehicle alternator while minimizing a processing burden of an external control device in monitoring a power generation status and an operational failure of the vehicle alternator.

To achieve the above object, one aspect of the present invention provides a vehicle alternator failure monitoring system for monitoring an operational failure of a vehicle alternator. The vehicle alternator failure monitoring system comprises an external control device operative to perform processing depending on a power generation status of the vehicle alternator, and a vehicle alternator control device controlling a generated voltage of the vehicle alternator at a given level and operative to transmit a serial communication signal representing the power generation status of the vehicle alternator to the external control device over a serial communication. The vehicle alternator control device comprises power generation status signal transmission means operative to transmit the serial communication signal in at least two transmission modes including a first power generation status signal transmission mode to transmit a first data representing a first content of the power generation status of the vehicle alternator and a failure flag indicative of the presence of or absence of the operational failure of the vehicle alternator and a second power generation status signal transmission mode to transmit a second data representing a second content of the power generation status of the vehicle alternator.

With such a structure, the external control device can be suffice to have a structure to receive the serial communication signal with data transmitted in the first power generation status signal transmission mode with less volume of communication data. This results in remarkable reduction in a processing burden of the external control device.

Further, with the vehicle alternator failure monitoring system set forth above, the vehicle alternator control device may preferably comprise power generation status storage means for storing the first and second data to be transmitted to the external control device as the serial communication signal, and alternator failure judgment means operative to make judgment on the presence of or absence of the operational failure of the vehicle alternator. Thus, if the alternator failure judgment means makes judgment that the operational failure of the vehicle alternator has occurred, the power generation status storage means is disenabled to write the first and second data and holds data representing a power generation status appearing in the occurrence of the operational failure.

With such an arrangement, storing data representing the power generation status appearing in the occurrence of the operational failure allows such data to be transmitted in the second power generation status signal transmission mode. This enables the external control device to precisely implement judgment on an operational failure (that is, a power generation failure) of the alternator using the power generation status appearing in the occurrence of the operational failure.

Furthermore, with the vehicle alternator failure monitoring system set forth above, the external control device may be preferably operative to send a transmission request to the vehicle alternator control device for transmission of the serial communication signal on the second data upon specifying the second power generation status signal transmission mode when an occurrence of the operational failure is judged based on the failure flag contained in the serial communication signal transmitted in the first power generation status signal transmission mode.

With such an arrangement, the external control device is capable of getting detailed data related to the power generation status of the vehicle alternator through the use of the serial communication signal being transmitted upon specifying the second power generation status signal transmission mode in the occurrence of the operational failure.

Moreover, with the vehicle alternator failure monitoring system set forth above, the power generation status signal transmission means may be preferably operative to transmit the first data including the failure flag representing the presence of the operational failure in the first power generation status signal transmission mode and, subsequently, transmit the second data in the second power generation status signal transmission mode after which the first power generation status signal transmission mode is restored again with a state in which the power generation status storage means restarts writing the first and second data.

This makes it possible for the external control device to retrieve data representing the newest power generation status again upon completion of the operation executed in response to the operational failure of the vehicle alternator. Also, in an event that no data is received by the external control device in the second power generation status signal transmission mode due to external noise mixed into a transmission line, the vehicle alternator control device can transmit the serial communication signal containing data, representing the power generation status in the presence of the operational failure stored in the power generation status storage means, to the external control device in the second power generation status signal transmission mode again.

Additionally, with the vehicle alternator failure monitoring system set forth above, the first power generation status signal transmission mode may preferably have a data volume less than that of the second power generation status signal transmission mode.

With such an arrangement, the external control device can have a minimized processing burden and an increased response in getting the power generation status of the vehicle alternator using the first power generation status signal transmission mode available to provide a notification on the presence of or absence the operational failure of the vehicle alternator.

Besides, with the vehicle alternator failure monitoring system set forth above, the external control device may be preferably operative to make judgment on the presence of or absence of a notification regarding the operational failure of the vehicle alternator depending on the second data, received in the second power generation status signal transmission mode with the occurrence of the operational failure of the vehicle alternator, and a vehicle status information representing a vehicle status appearing at a time point of the occurrence of the operational failure related to the vehicle alternator.

By so doing, even with the external control device retrieving data indicative of a failure state resulting from a drop in the output voltage of the vehicle alternator, if such a drop in the output voltage of the vehicle alternator is a temporary drop caused by power-on operation of, for instance, a large electrical load, the external control device can be structured not to provide any notification on the presence of the operational failure of the vehicle alternator.

Further, with the vehicle alternator failure monitoring system set forth above, the power generation status signal transmission means may preferably comprise communication data register means for storing the first and second data to be transmitted, and serial communication transmission means operative to transmit the serial communication signal using one of the first and second data stored in the communication data register means.

With such a structure, since the first and second data are stored in the communication data register means and the serial communication transmission means is available to transmit the serial communication signal using one of the first and second data stored in the communication data register means, the external control device can retrieve the serial communication signal again even if a failure occurs in receiving data from the vehicle alternator control device. Thus, the external control device can operate in a reliable mode at all times to continuously perform precise processing.

Furthermore, with the vehicle alternator failure monitoring system set forth above, the power generation status storage means may preferably comprise first power generation status signal storage means for storing the first data to be transmitted to the external control device in the first power generation status signal transmission mode, and second power generation status signal storage means for storing the second data to be transmitted to the external control device in the second power generation status signal transmission mode.

With such a structure, the first and second data are stored in the first and second power generation status signal storage means for transmission through the serial communication transmission means to the external control device, resulting in a compact structure with reliability in operation.

Moreover, with the vehicle alternator failure monitoring system set forth above, the vehicle alternator control device may further preferably comprise power generation status detection means for detecting operating parameters of the vehicle alternator as functions related to the power generation status for use in controlling the generated voltage of the vehicle alternator at the given level, wherein the alternator failure judgment means makes judgment on the presence of or absence of the occurrence of the operational failure of the vehicle alternator depending on the operating parameters of the vehicle alternator.

With such a structure, due to the presence of the power generation status detection means operative to detect the operating parameters of the vehicle alternator as functions related to the power generation status, the alternator failure judgment means can make judgment on the presence of or absence of the occurrence of the operational failure of the vehicle alternator depending on the operating parameters of the vehicle alternator. This enables the alternator failure judgment means to make judgment whether or not the vehicle alternator encounters in the operational failure while making it possible to utilize the operating parameters for regulating the output voltage of the vehicle alternator. Thus, the external control device can retrieve the operating parameters of the vehicle alternator together with data, representing the presence of or absence of the operational failure of the vehicle alternator, in the first and second signal transmission modes different in data volume.

Also, with the vehicle alternator failure monitoring system set forth above, the vehicle alternator control device may further preferably comprise diagnosis judgment means operative to diagnose the occurrence of the operational failure of the vehicle alternator depending on the operating parameters detected by the power generation status detection means for setting on the failure flag in the serial communication signal when the occurrence of the operational failure is diagnosed while canceling the failure flag from the serial communication signal during normal operation of the vehicle alternator.

With such arrangement, due to the provision of the diagnosis judgment means operative to set on the failure flag in the serial communication signal when the occurrence of the operational failure is diagnosed while canceling the failure flag from the serial communication signal during normal operation of the vehicle alternator, the vehicle alternator control device can transmit the serial communication signal in the first and second power generation status signal transmission modes depending on the presence of or absence of the operational failure of the vehicle alternator. This results in a reduction in processing burden of the external control device during normal operation of the vehicle alternator with the resultant increase in response of the vehicle alternator.

Additionally, with the vehicle alternator failure monitoring system set forth above, the external control device may preferably comprise serial communication receiver means for receiving the serial communication signal from the vehicle alternator control device, diagnosis judgment means for providing a first diagnosis result, representing the presence of the operational failure of the vehicle alternator, and a second diagnosis result, representing the absence of the operational failure of the vehicle alternator, depending on the power generation status of the vehicle alternator, ID determination means for determining one of first and second specified IDs in response to the first and second diagnosis results for use in a transmission request to be transmitted to the vehicle alternator control device, and serial communication transmission means for sending the transmission request with the one of first and second specified IDs to the vehicle alternator control device.

With such a structure, due to the provision of the external control device including the diagnosis judgment means for providing the first and diagnosis results depending on the power generation status of the vehicle alternator and the ID determination means for determining the first and second specified IDs in response to the first and second diagnosis results for use in the transmission request to be transmitted to the vehicle alternator control device, the external control device can command the vehicle alternator control device for transmission of the serial communication signal including only data related to the operating parameters of the vehicle alternator in a minimal data volume necessary for performing desired processing during normal operation of the vehicle alternator. Thus, no delay occurs in response of operation of the external control device.

Besides, with the vehicle alternator failure monitoring system set forth above, the power generation status signal transmission means may preferably comprise power generation status detection means for detecting operating parameters of the vehicle alternator as functions related to the power generation status for use in controlling the generated voltage of the vehicle alternator at the given level, selector means for selecting one of the first and second power generation status signal transmission modes in response to the one of first and second specified IDs delivered from the external control device, and serial communication transmission means for transmitting selected one of the first and second power generation status signal transmission modes to the serial communication receiver means of the external control device.

With such a structure, due to the provision of the power generation status signal transmission means comprised of the power generation status detection means for detecting the operating parameters of the vehicle alternator as functions related to the power generation status for use in controlling the generated voltage of the vehicle alternator at the given level and the selector means for selecting the first and second power generation status signal transmission modes in response to the one of first and second specified IDs delivered from the external control device, the power generation status signal transmission means can transmit the serial communication signal in selected one of the first and second power generation status signal transmission modes to the serial communication receiver means of the external control device. This enables the external control device to receive the serial communication signal in minimal data volume representing the operational parameters of the vehicle alternator during normal operation thereof while enabling retrieval of the serial communication signal in maximal data volume representing the operational parameters of the vehicle alternator when the operational failure is detected, resulting in reduction in processing burden of the external control device with an increases response in operation thereof.

In addition, with the vehicle alternator failure monitoring system set forth above, the power generation status signal transmission means may further comprise diagnosis judgment means for setting the failure flag in response to the occurrence of the operational failure of the vehicle alternator, power generation status storage means for storing the first and second data to be transmitted to the external control device as the serial communication signal, write permit circuit means for permitting or inhibiting writing of the first and second data into the power generation status storage means in response to the failure flag set by the diagnosis judgment means.

With such an arrangement, due to the provision of the power generation status signal transmission means including the diagnosis judgment means for setting the failure flag in response to the occurrence of the operational failure of the vehicle alternator and the power generation status storage means for storing the first and second data to be transmitted to the external control device as the serial communication signal, the writing of the first and second data into the power generation status storage means can be permitted or inhibited in response to the failure flag set by the diagnosis judgment means. This allows the power generation status signal transmission means of the vehicle alternator control device to respond to the transmission request delivered from the external control device so as to transmit the serial communication signal in first and second modes different in data volume. Thus, the external control device can operate with high response in increased reliability during normal operation of the vehicle alternator.

Also, with the vehicle alternator failure monitoring system set forth above, the first data of the serial communication signal to be transmitted in the first power generation status signal transmission mode may preferably include a first ID, the first content of the power generation status containing a minimal number of operating parameters of the vehicle alternator and a result of a diagnosis on the operational failure of the vehicle alternator, and the second data of the serial communication signal to be transmitted in the second power generation status signal transmission mode includes a second ID and the second content of the power generation status containing further operating parameters in addition to the first content of the power generation status.

With such an arrangement, the serial communication signal has first and second IDs that can be specified by the external control device in serial communication between the vehicle alternator control device and the external control device so as to enable the vehicle alternator control device to transmit the serial communication signal in a minimal data volume to the external control device. This results in a reduction on processing burden to be executed by the external control device with an increase in response of operations of the external control device.

According to another aspect of the present invention, there is provided a method of monitoring an operational failure of a vehicle alternator, the method comprising preparing an external control device operative to perform processing depending on a power generation status of the vehicle alternator, preparing a vehicle alternator control device controlling a generated voltage of the vehicle alternator at a given level and operative to transmit a serial communication signal representing the power generation status of the vehicle alternator to the external control device over a serial communication and transmitting one of the first and second serial communication signals in at least two transmission modes including a first power generation status signal transmission mode and a second power generation status signal transmission mode. The first serial communication signal includes a first data representing a first content of the power generation status of the vehicle alternator and a failure flag indicative of the presence of or absence of the operational failure of the vehicle alternator, and the second serial communication signal includes a second data representing a second content of the power generation status of the vehicle alternator.

With such a method, the external control device can receive the serial communication signal with data transmitted in the first power generation status signal transmission mode with less volume of communication data. This results in remarkable reduction in a processing burden of the external control device. Consequently, the external control device can operate with high response in a highly reliable manner.

Furthermore, the method of monitoring the operational failure may further preferably comprise detecting operating parameters of the vehicle alternator as the power generation status of the vehicle alternator, storing data representing the power generation status of the vehicle alternator in storage means making judgment on the presence of or absence of the operational failure of the vehicle alternator, and interrupting the storing data, when the judgment is made that the operational failure is present, while holding data representing the power generation status detected in the presence of the operational failure.

With such a method of monitoring the operational failure, data representing the power generation status appearing in the occurrence of the operational failure is stored and the writing of data is inhibited while data representing the power generation status detected in the presence of the operational failure. Thus, data representing the power generation status in the presence of the operational failure is sustained and can be transmitted to the external control device in the second power generation status signal transmission mode. This enables the external control device can reliably implement judgment using the power generation status in the occurrence of the operational failure included in the second serial communication signal to find whether or not the operational failure occurs in the vehicle alternator.

Moreover, the method of monitoring the operational failure may further preferably comprise allowing the external control device to send a transmission request to the vehicle alternator control device for transmission of the second data upon specifying the second power generation status signal transmission mode in the presence of the operational failure in the first data of the first serial communication signal transmitted in the first power generation status signal transmission mode.

With such a step of allowing the external control device to send the transmission request to the vehicle alternator control device for transmission of the second data, the vehicle alternator control device can transmit the serial communication signal to the external control device in the second power generation status signal transmission mode. This enables the external control device to precisely implement judgment on an operational failure (that is, a power generation failure) of the alternator using the power generation status appearing in the occurrence of the operational failure.

With such a method of monitoring the operational failure, the transmitting one of the first and second serial communication signals in at least two transmission modes may preferably comprises transmitting the first serial communication signal with the first data, including a failure flag indicative of the presence of the operational failure of the vehicle alternator, to the external control device in the first power generation status signal transmission mode, subsequently transmitting the second serial communication signal with the second data to the external control device in the second power generation status signal transmission mode, and restarting the storing data representing the power generation status of the vehicle alternator in the storage means when the first power generation status signal transmission mode is restored again.

With such steps, the external control device is enabled to retrieve data representing the newest power generation status again upon completion of the operation executed in response to the operational failure of the vehicle alternator. Also, in an event that no data is received by the external control device in the second power generation status signal transmission mode due to external noise mixed into a transmission line, the vehicle alternator control device can transmit the serial communication signal containing data, representing the power generation status in the presence of the operational failure stored in the power generation status storage means, to the external control device in the second power generation status signal transmission mode again.

With the method of monitoring the operational failure, the external control device may preferably operate to make judgment on the presence of or absence of a notification regarding the operational failure of the vehicle alternator depending on the second data, received in the second power generation status signal transmission mode with the occurrence of the operational failure of the vehicle alternator, and a vehicle status information representing a vehicle status appearing at a time point of the occurrence of the operational failure related to the vehicle alternator.

With such operation of the external control device, even in retrieving data indicative of a failure state resulting from a drop in the output voltage of the vehicle alternator, if such a drop in the output voltage of the vehicle alternator is a temporary drop caused by power-on operation of, for instance, a large electrical load, the external control device can be structured not to provide any notification on the presence of the operational failure of the vehicle alternator.

BRIEF DESCRIPTION OF THE DRAWINGS

FIGS. 2A and 2B are views showing formats of first and second power generation status signals to be transmitted in serial communication from the vehicle alternator control device to the ECU in accordance with LIN protocol in response to a transmission request specifying an ID for one of the power generation status signals.

FIG. 3 is a flow chart showing a basic sequence of operations of the vehicle alternator failure monitoring system for carrying out a vehicle alternator failure monitoring method according to the present invention.

DETAILED DESCRIPTION OF PREFERRED EMBODIMENTS

Now, a vehicle alternator failure monitoring system of an embodiment according to the present invention and related monitoring method are described below in detail with reference to the accompanying drawings. However, the present invention is construed not to be limited to such embodiments described below and technical concepts of the present invention may be implemented in combination with other known technologies or the other technology having functions equivalent to such known technologies.

Now, a vehicle alternator failure monitoring system of one embodiment to which the present invention is applied is described below in detail with reference to the accompanying drawings.

Figure 1:
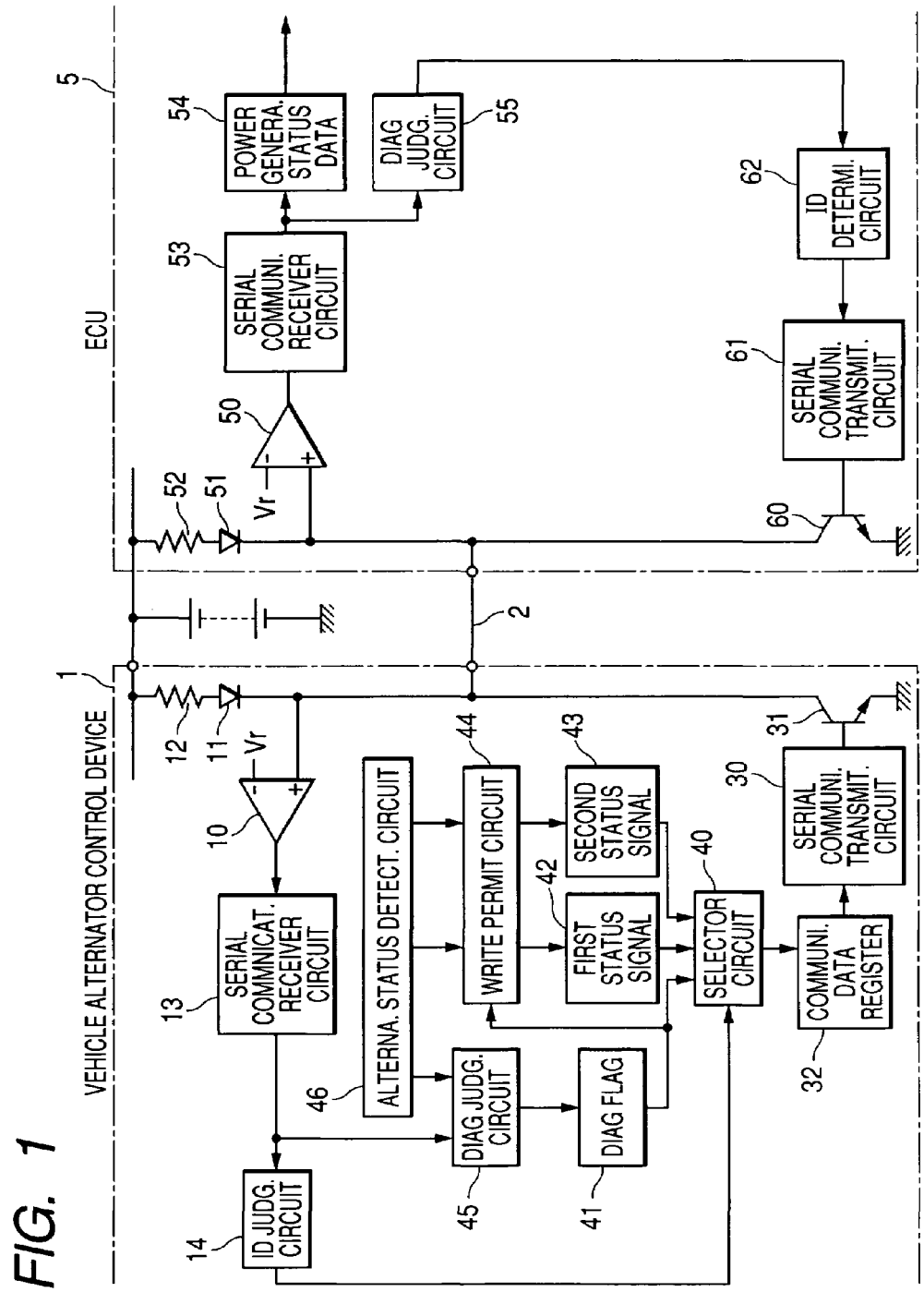
FIG. 1 is a block diagram showing a vehicle alternator control device and a partial structure of an ECU forming a vehicle alternator failure monitoring system of one embodiment according to the present invention.

FIG. 1 is a block diagram showing a vehicle alternator control device 1 and an engine control unit (ECU) 5 with both of which the vehicle alternator failure monitoring system of the present embodiment is formed.

As shown in FIG. 1, the vehicle alternator control device 1 and the ECU 5 are connected to each other via a transmission line 2. The vehicle alternator control device 1 may be incorporated in a vehicle alternator (not shown) or mounted in an area close proximity to the vehicle alternator as an outside component part. The ECU 5, also playing a role as an external control unit, is placed in an area remote from the vehicle alternator.

First, the ECU 5 is described in detail with reference to FIG. 1. As shown in FIG. 1, the ECU 5 is comprised of a voltage comparator 50, a diode 51, a resistor 52, a serial communication receiver circuit 53, a power generation status data storage section 54, a diagnosis judgment circuit 55, a transistor 60, a serial communication transmitter circuit 61 and an ID determination circuit 62.

The voltage comparator 50 operates as a receiver circuit that receives a serial communication signal delivered from the vehicle alternator control device 1 through the transmission line 2. The resistor 2 and the diode 51 are connected in series to form a pull-up circuit.

The transistor 60 is driven with the pull-up circuit, which plays a role as a load, for transmitting a serial communication signal to the vehicle alternator control device 1 through the transmission line 2. The pull-up circuit, composed of the resistor 2 and the diode 51, and the transistor 60 form a driver circuit.

The serial communication receiver circuit 53 demodulates data, representing a power generation status, and data (data indicative of the presence of or absence of an operative failure related to the vehicle alternator), representing a diagnosis result, which are involved in the serial communication signal delivered from the vehicular power generation unit 1.

Of these, data representing the power generation status is stored in the power generation status data storage section 54 and the ECU 5 processes such data in accordance with given program for use in running and controlling a vehicle (not shown).

In the meanwhile, data indicative of the diagnosis result is delivered to the diagnosis judgment circuit 55. The diagnosis judgment circuit 55 makes judgment depending on data indicative of the diagnosis result as to whether or not a diagnosed operational failure related to the vehicle alternator is present.

The ID determination circuit 62 determines an ID to be specified for a transmission request, delivered to the vehicle alternator control device 1, based on judgment result delivered from the diagnosis judgment circuit 55. In case where no diagnosed operational failure is present, an ID1 is assigned to the transmission request and, in contrast, if no diagnosed operational failure is present, an ID 2 is assigned to the transmission request.

The serial communication transmitter circuit 61 drives the transistor 60 to transmit the serial communication signal, representing the transmission request with the specified ID. determined by the ID determination circuit 62, to the vehicle alternator control device 1 via the transmission line 1.

FIGS. 2A and 2B show formats of first and second power generation status signals to be transmitted from the vehicle alternator control device 1 to the ECU 5 in serial communication in accordance with an LIN protocol in response to the transmission request with the specified ID. FIG. 2A shows the format of the first power generation status signal to which ID1 is assigned. FIG. 2B shows the format of the second power generation status signal to which ID2 is assigned.

As shown in FIG. 2A, the first power generation status signal (hereinafter referred to as the first power generation status signal PG1), appearing when the ID1 is specified, has regions A1 to A8 assigned for "SYNCH. BREAK.", "SYNCH. FIELD", "TRANSMISSION ID1", "GENERATED VOLTAGE", "EXCITATION CURRENT", "DUTY", "DIAG" and "CHECK", respectively, in this order.

"TRANSMISSION ID1" corresponds to "ID1" assigned to the power generation status signal PG1 in the transmission request delivered from the ECU 5. "GENERATED VOLTAGE" corresponds to data of an output voltage generated by the vehicle alternator. "EXCITATION CURRENT" corresponds to data of an excitation current flowing through an excitation winding of the vehicle alternator. "DUTY" corresponds to a duty cycle of a train of drive pulses applied to a power transistor for driving the excitation current. "DIAG" corresponds to the presence of or absence of the diagnosed operational failure related to the vehicle alternator. "CHECK" corresponds to data for checking parity or CRC or the like.

As shown in FIG. 2B, further, the second power generation status signal (hereinafter referred to as the second power generation status signal PG2), appearing with the specified ID2, has regions B1 to B11 assigned to "SYNCH. BREAK.", "SYNCH. FIELD", "TRANSMIS. ID2", "GENERATED VOLTAGE", "EXCITAT. CURRENT", "DUTY", "TEMPER.", "ROTAT. SPEED", "ALTERNA. PHASE VOLTAGE", "ALTERNA. MODEL" and "CHECK", respectively, in this order.

"TRANSMISSION ID2" corresponds to "ID2" assigned to the power generation status signal PG2 in the transmission request delivered from the ECU 5. "GENERATED VOLTAGE", "EXCITAT. CURRENT", "DUTY" and "CHECK" correspond to the same data, related to the vehicle alternator, as those of the power generation status signal PG1. The power generation status signal PG2 also includes additional operating parameters of the vehicle alternator such as "TEMPER.", "ROTAT. SPEED", "ALTERNA. PHASE VOLT." in the regions B7 to B9, respectively. "TEMPER." corresponds to a temperature of the vehicle alternator. "ROTAT. SPEED" corresponds to a rotational speed of the vehicle alternator. "ALTERNA. PHASE VOLT." corresponds to a phase voltage of a stator winding of the vehicle alternator. In addition, the power generation status signal PG2 further includes the region B10 for "ALTERNA. MODEL" that corresponds to a model of the relevant vehicle alternator.

Thus, the first power generation status signal PG1 has less data volume than that of the second power generation status signal PG2. That is, the first power generation status signal PG1 includes a minimal number of operating parameters needed for controlling a duty cycle of a power transistor to control the excitation current flowing through the excitation winding of the vehicle alternator such that the output voltage is maintained at a given desired level. On the contrary, the second power generation status signal PG2 has data related to additional operating parameters such as, for instance, the temperature, the rotational speed and the phase voltage of the vehicle alternator and another data related to the model of the relevant vehicle alternator. During normal operation of the vehicle alternator in the absence of the operational failure therein, the vehicle alternator control device 1 transmits the first power generation status signal PG1 with such a less volume data to the ECU 5, which can consequently operates in high response with less number of data to be processed.

Also, in FIG. 2B, S1 designates an ECU command signal, which is applied to the ECU 5 for commanding the operation of the same, and T1 designates a time frame during which a regulator response (in transmission) is initiated to control excitation current of the vehicle alternator so as to regulate the output voltage at a fixed level.

FIG. 3 is a flow chart showing a basis sequence of operations to be executed by the ECU 5 for receiving a power generation status signal from the vehicle alternator control device 1 upon transmitting a transmission request thereto.

First in step 100, a transmission request with an ID1, specified by the ID determination circuit 62 (see FIG. 1), is transmitted from the serial communication transmitter circuit 61 to the vehicle alternator control unit 1 through the transmission line 2.

In succeeding step 101, the vehicle alternator control unit 1 responds to such a transmission request with the specified ID1 and transmits the first power generation status signal PG1 with a data content shown in FIG. 2A to the serial communication receiver circuit 53 via the transmission line 2. Upon receipt of the first power generation status signal PG1, the diagnosis judgment circuit 55 receives "DIAG" data, included in the power generation status signal PG1, and other various data such as, for instance, the generated voltage and the excitation current are delivered to and stored in the power generation status data storage section 54.

Next in step 102, the diagnosis judgment circuit 55 makes judgment whether or not a DIAG flag is set on. If the DIAG flag is not set on, then in step 103, negative judgment is performed by the diagnosis judgment circuit 55 and the ECU 5 executes operation depending on data related to operating parameters of the vehicle alternator stored in the power generation status data storage section 54 as the power generation status. During such operations of the ECU 5, a vehicle status appearing at that time point is also taken into consideration. Thereafter, the operation is turned back to step 100 for repeated operations in various steps mentioned above upon receipt of the first power generation status signal PG1 transmitted in response to the transmission request with the specified ID1.

On the contrary, if the DIAG flag is set on, then in step 102, the diagnosis judgment circuit 55 makes positive judgment. In subsequent step 104, the ID determination circuit 62 specifies ID2 and the serial communication transmitter circuit 61 transmits a second transmission request with the specified ID2 to the vehicle alternator control unit 1.

Upon receipt of this transmission request, the vehicle alternator control unit 1 transmits the second power generation status signal PG2, having a data content shown in FIG. 2B, which is received by the serial communication receiver circuit 53 in step 105. Various data contained in the received power generation status signal PG2 for representing a detailed power generation status, involving various operating parameters of the vehicle alternator, are delivered to the power generation status data storage section 54.

In subsequent step 106, moreover, the serial communication receiver circuit 53 makes judgment as to whether or not a communication failure is present. If the communication failure is found to be present, that is, when no second power generation status signal 2 is received from the vehicle alternator control device 1, positive judgment is executed and the operation goes back to step 104 for repeatedly executing the operation to send the transmission request with the specified ID2 the vehicle alternator control device 1.

In contrast, if no communication failure is present, in step 107, negative judgment is made and, then, the ECU 5 executes a given operation in response to the occurrence of the operational failure, indicated by the DIAG flag, using the operating parameters stored in the power generation status data storage section 54. Such operation is performed in consideration of the vehicle status information representing the vehicle status at a time point in which the operational failure is present in the vehicle alternator. With such operation, even upon receipt of data representing a failure condition resulting from a drop in the output voltage of the vehicle alternator, if such a voltage drop is caused by a temporary drop in voltage resulting from a large electrical load being powered on, then, the ECU 5 provides a vehicle driver with no notification related to the operational failure of the vehicle alternator.

Thus, during a normal operation of the vehicle alternator with no occurrence of an actual failure, the ECU 5 is suffice to receive data (that is, data transmitted in a first power generation status signal transmission mode) of the first power generation status signal PG1 with less data volume and make judgment on the presence of or absence of the occurrence of the operational failure of the vehicle alternator. This makes it possible for the ECU 5 to remarkably minimize a burden on processing data.

Next, turning back to FIG. 1, the vehicle alternator control device 1 is described below in detail. The vehicle alternator control device 1 is comprised of a voltage comparator 10, a diode 11, a resistor 12, a serial communication receiver circuit 13, an ID judgment circuit 14, a serial communication transmitter circuit 30, a transistor 30, a communication data register 32, a selector circuit 40, a DIAG flag setting circuit 41, a first power generation status signal storage section 42, a second power generation status signal storage section 43, a writing permit circuit 44, a DIAG judgment circuit 45 and an alternator status detection circuit 46.

The voltage comparator 10, the diode 11, the resistor 12 and the transistor 31 form a communication interface circuit 47. The voltage comparator 10 plays a role as a receiver circuit that receives the signal, including the transmission request with the specified ID, from the ECU5 via the transmission line 2. The resistor 12 and the diode 11 are connected in series to form a pull-up circuit 48. The transistor 31 is driven with a load composed of the pull-up circuit 48 for transmitting the first and second power generation status signals PG1 and PG2 to the ECU 5 through the transmission line 2 in response to the transmission request with the specified ID transmitted from the ECU 5. The pull-up circuit 48 and the transistor 31 form a driver circuit DR1. With a status in which no communication is made, the pull-up circuit 48, composed of the resistor 12 and the diode 11, allows the transmission line 2 to lie at a voltage potential equal to a battery voltage. Further, if communication starts and data transmission begins, the transistor 31, playing a role as the driver circuit DR1, is turned on to allow the transmission line 2 to lie at a low voltage. Turning on or turning off the transistor 31 provides a logic level of "0" or "1" for serial communication.

The serial communication receiver circuit 13 demodulates various data involved in the serial communication signal delivered from the ECU 5. Upon receipt of the transmission request sent from the ECU 5, the ID (ID1 or ID2) specified in transmission request is delivered to the ID judgment circuit 14. The ID judgment circuit 14 makes judgment on a kind of the ID specified in the transmission request. This judgment result is then delivered to the selector circuit 40.

The DIAG flag setting circuit 41 plays a role as a circuit to set a failure flag representing the presence of or absence of the occurrence of an operational failure related to the vehicle alternator. The DIAG flag setting circuit 41 is arranged such that when the operational failure is present, the DIAG flag setting circuit 41 executes the operation to set a DIAG flag whereas during a normal operation of the vehicle alternator, the preset DIAG flag is cancelled.

The first power generation signal storage section 42 stores data for the first power generation status signal PG1. The second power generation signal storage section 43 stores data for the second power generation status signal PG2.

The writing permit circuit 44 commands a write permit or write inhibit of data for the first and second power generation signal storage sections 42, 43. In case where the DIAG flag is set on, that is, when the operational failure occurs in the vehicle alternator, the write of data is inhibited and the first and second power generation signal storage sections 42, 43 do not execute writing data until the transmission of the DIAG flag is terminated and the ECU 5 commands canceling the write inhibit, that is, until the transmission request with the specified ID1 is transmitted again after the transmission request with the specified ID2 is transmitted.

The alternator status detection circuit 46 serves to detect various data related to power generation statuses such as operating parameters of the vehicle alternator. Thus, the alternator status detection circuit 46 obtains various data needed for generating the first power generation status signal PG1, shown in FIG. 2A, and the second power generation status signal PG2 shown in FIG. 2B.

The selector circuit 40 serves to select the first and second power generation status signals PG1 and PG2 to be output depending on the judgment result outputted from the ID judgment circuit 14. If the judgment result belongs to a kind corresponding to ID1, then, the selector circuit 40 selects data, stored in the first power generation signal storage section 42, and the content (including data representing whether or not the flag is set on) of the DIAG flag set by the DIAG flag setting circuit 41 for transmitting the first power generation status signal PG1, shown in FIG. 2A, to the ECU 5 through the transmission line 2. On the contrary, if the judgment result of the ID judgment circuit 14 belongs to another kind corresponding to ID2, then, the selector circuit 40 selects data, stored in the second power generation signal storage section 43, for transmitting the second power generation status signal PG2, shown in FIG. 2B, to the ECU 5.

The communication data register 32 holds data output from the selector circuit 40. The serial communication transmitter circuit 30 plays a role as a unit to generate the first power generation status signal PG1, shown in FIG. 2A, and the second power generation status signal PG2, shown in FIG. 2B, using data stored in the communication data register 32, and is operative to drive the transistor 31 of the driver circuit DR1 for transmitting either one of the first and second power generation status signals PG1, PG2 to the ECU 5 through the transmission line 2.

The diode 11, the resistor 12, the transistor 31, the serial communication transmitter circuit 30 and the communication data register 32 play roles as a power generation status signal transmission means. The first power generation signal storage section 42 and the second power generation signal storage section 43 play roles as a power generation status storage means. The DIAG judgment circuit 45 plays a role as an alternator failure judgment means. Further, data transmission using the first power generation status signal PG1, shown in FIG. 2A, corresponds to the first power generation status signal transmission mode and data transmission using the second power generation status signal PG2, shown in FIG. 2B, corresponds to the second power generation status signal transmission mode.

Figure 4:
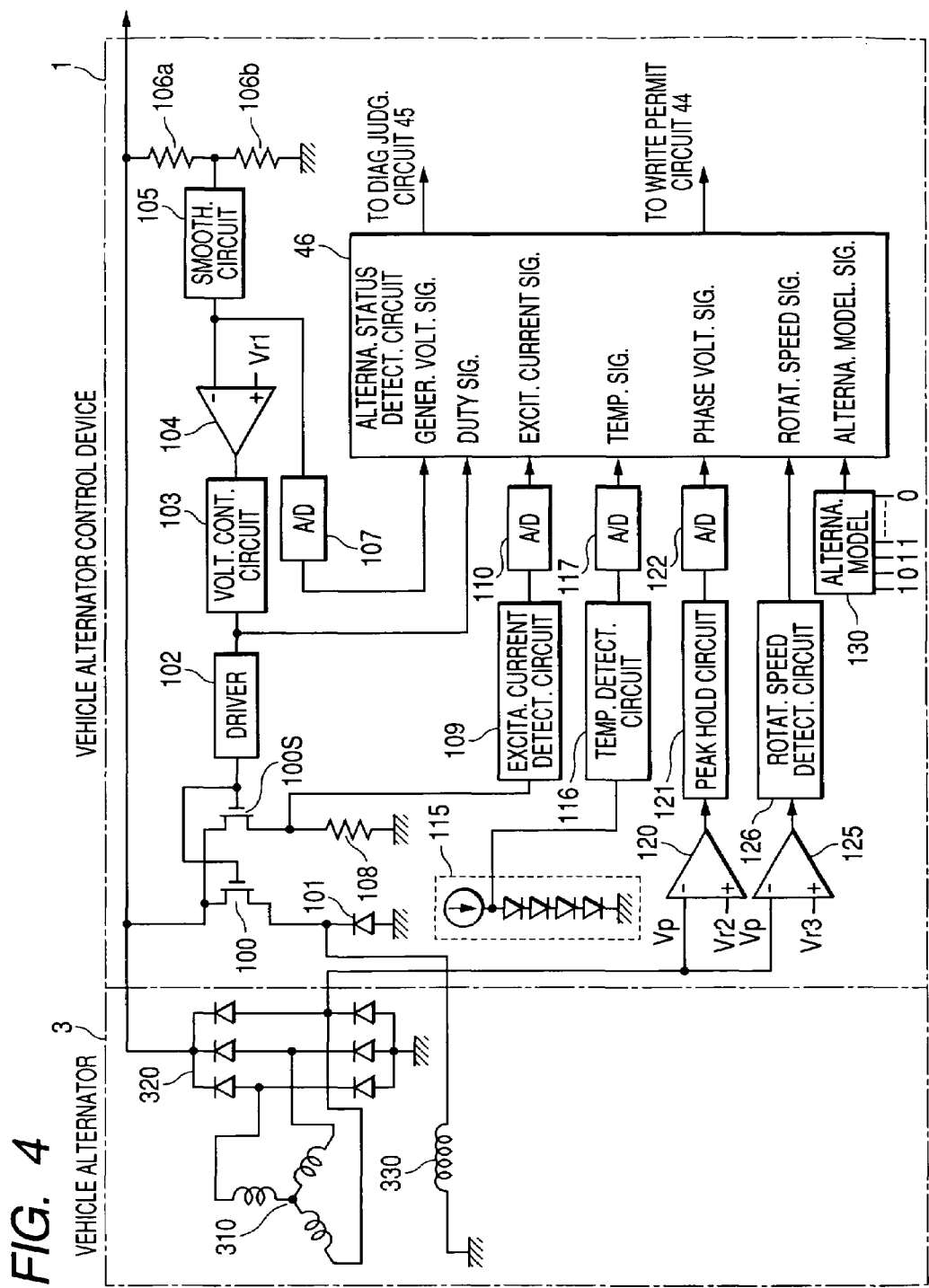
FIG. 4 is a block diagram showing the vehicle alternator control device and an overall structure of a vehicle alternator with which the vehicle alternator control device is associated.

Next, a concrete example of the vehicle alternator control device 1 associated with the vehicle alternator is described with reference to FIG. 4. FIG. 4 is a block diagram showing an overall structure of the vehicle alternator control device 1 and the vehicle alternator 3 with which the vehicle alternator control device 1 is associated.

As shown in FIG. 4, the vehicle alternator 3 is comprised of a three phase stator windings 310, a rectifier circuit 320 connected to the three-phase winding 310 to perform full-wave rectification, and an excitation winding 330 incorporated in a rotor of the vehicle alternator 3. The vehicle alternator 3 generates an output voltage at an output terminal 310a that is regulated at a given value through operation of the vehicle alternator control device 1 by intermittently controlling the energization of the excitation winding 330.

Further, the vehicle alternator control device 1 is comprised of an excitation current drive transistor 100, a transistor 100S, a flywheel diode 101, a driver 102, a voltage control circuit 103, voltage comparators 104, 125, a smoothing circuit 105, resistors 106a, 106b, 108, analog/digital converters (A/D converters) 107, 110, 117, 122, a peak hold circuit 121, a rotational speed detection circuit 126, and an alternator-model setting circuit 130. Also, the vehicle alternator control device 1 comprises other component elements, involving those shown in FIG. 1, and FIG. 4 shows only a few of these component elements with other remaining component parts being omitted in FIG. 4.

The excitation current drive transistor 100 is a semiconductor switching element that is connected to the excitation winding 330 in series to turn on or turn off the energization current flowing through the excitation winding 330. The switching element has a drain connected to the output terminal 310a of the vehicle alternator 3 and a source connected to the ground via the flywheel diode 101. The flywheel diode 101 is connected to the excitation winding 330 in parallel thereto and plays a role to recirculate excitation current flowing through the excitation winding 330 when the excitation current drive transistor 100 is turned off.

The resistors 106a, 106b form a voltage divider circuit with which the output voltage of the vehicle alternator 3 is divided to provide a divided voltage. The divided voltage is smoothed by the smoothing circuit 105 to provide a smoothed voltage that in turn is applied to a negative input terminal of the voltage comparator 104 whose positive input terminal is applied with a reference voltage Vr1 corresponding to a regulated voltage. Accordingly, as the output voltage of the vehicle alternator 3 becomes lower than a regulated voltage, an output of the voltage comparator 104 takes a high level and, in contrast, if the output voltage of the vehicle alternator 3 becomes higher than the regulated voltage, the output of the voltage comparator 104 takes a low level.

The voltage control circuit 103 drives the driver 102 in response to the output of the voltage comparator 104 for controllably turning on or turning off the excitation current drive transistor 100. For instance, the voltage control circuit 103 is so arranged as to drive the driver 102 with a given duty cycle greater than 50% when the output of the voltage comparator 104 takes the high level while driving the driver 102 with another given duty cycle (that is, for instance, at a minimal duty ratio needed for detecting excitation current) less than 50% when the output of the voltage comparator 104 takes the low level. Moreover, an output of the voltage control circuit 103 is applied to the alternator status detection circuit 46 as a duty signal. The alternator status detection circuit 46 serves to detect a duty cycle of the applied duty signal.

The analog/digital converter 107 plays a role to convert the output voltage of the smoothing circuit 105 into digital data representing a generated voltage signal that is input to the alternator status detection circuit 46.

The transistor 100S is driven by the driver 102 and turned on or turned off at the same timing as that at which the excitation current drive transistor 100. The transistor 100S has a source to which a resistor 108 is connected for detecting excitation current. The excitation current detection circuit 109 is connected to one terminal of the resistor 108 for detecting a terminal voltage thereof. The analog/digital converter 110 serves to convert a detected voltage delivered from the excitation current detection circuit 109 into digital data representing an excitation current signal, which is applied to the alternator status detection circuit 46.

The temperature sensor 115 is composed of a constant current source 115a and a plurality of diodes 115b connected to the constant current source 115a in series. The diodes 115a have characteristics with forward voltages varying depending on surrounding temperatures and the temperature sensor 115 utilizes such characteristics to output a voltage corresponding to the temperature of the vehicle alternator 3. The temperature detection circuit 116 detects an output voltage of the temperature sensor 115. The analog/digital converter circuit (A/D converter) 117 serves to convert a detected voltage delivered from the temperature detection circuit 116 into digital data representing a temperature signal, which is applied to the alternator status detection circuit 46.

The differential amplifier 120 has a negative input terminal applied with a single phase voltage Vp delivered from the stator winding 310 and a positive input terminal applied with a given reference voltage Vr2. Thus, the differential amplifier 120 plays a role to perform differential amplification of these input voltages and output amplified voltages. The peak hold circuit 121 holds a peak value of the output voltage of the differential amplifier 120. The analog/digital converter circuit (A/D converter) 122 serves to convert a peak hold voltage delivered from the peak hold circuit 121 into digital data representing a phase voltage signal, which is applied to the alternator status detection circuit 46.

The voltage comparator 125 has a negative input terminal applied with the single phase voltage Vp delivered from the stator winding 310 and a positive input terminal applied with a given reference voltage Vr3. Thus, the voltage comparator 125 plays a role to output a high level signal when the single phase voltage Vp is less than the reference voltage Vr3 while outputting a low level signal when the single phase voltage Vp is greater than the reference voltage Vr3.

The rotational speed detection circuit 126 serves to detect the rotational speed of the vehicle alternator 3 based on a frequency of an output signal from the voltage comparator 125 to output digital data representing the rotational speed, with such data being applied to the alternator status detection circuit 46.

The alternator model setting circuit 130 plays a role to output data, representing a model of the vehicle alternator 3, as an alternator model signal. When assembling the vehicle alternator control device 1 onto the vehicle alternator 3, the model of such a particular alternator may be written on a non-volatile register. In another alternative, a plurality of thermal fuses may be provided in correspondence to respective bits and cut out in matching to the model of the vehicle alternator 3.

With such an arrangement set forth above, the vehicle alternator control device 1 controllably turn on or turn off the excitation current drive transistor 100 to adjust excitation current flowing through the excitation winding 330 for thereby regulating the output voltage of the vehicle alternator 3, while detecting a variety of operating parameters of the vehicle alternator 3 as the power generation status.

Next, description is made of a concrete example on how a failure judgment is executed by the DIAG judgment circuit 45. For instance, the DIAG judgment circuit 45 detects the presence of or absence of a failure in the temperature of the vehicle alternator 3 in response to the temperature signal detected by the vehicle alternator status detection circuit 46 shown in FIG. 4.

Figure 5:
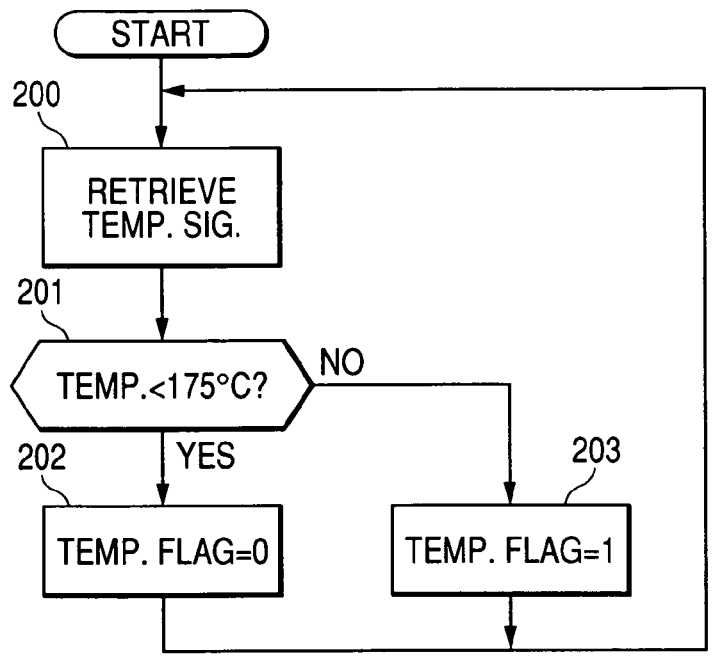
FIG. 5 is a flow chart showing a basic sequence of operations in executing a diagnosis judgment based on a temperature signal detected by the vehicle alternator control device.

FIG. 5 is a flow chart showing a basic sequence of operations to be executed by the DIAG judgment circuit 45 for executing the DIAG judgment based on the temperature signal.

First in step 200, the DIAG judgment circuit 45 retrieves the temperature signal from the alternator status detection circuit 46. In succeeding step 201, the DIAG judgment circuit 45 makes judgment as to whether or not the detected temperature is less than 175° C. In next step 202, if the detected temperature is less than 175° C., a positive judgment is made and a temperature flag is reset to "0". On the contrary, in step 203, if the detected temperature is higher than 175° C., a negative judgment is made and the temperature flag is set to "1". Moreover, since the DIAG flag includes plural bits, among which a specified bit is allocated to the temperature flag. With the temperature flag set in a logic level with "1", such a status represents that the DIAG flag is set in correspondence to the occurrence of the failure.

Figure 6:
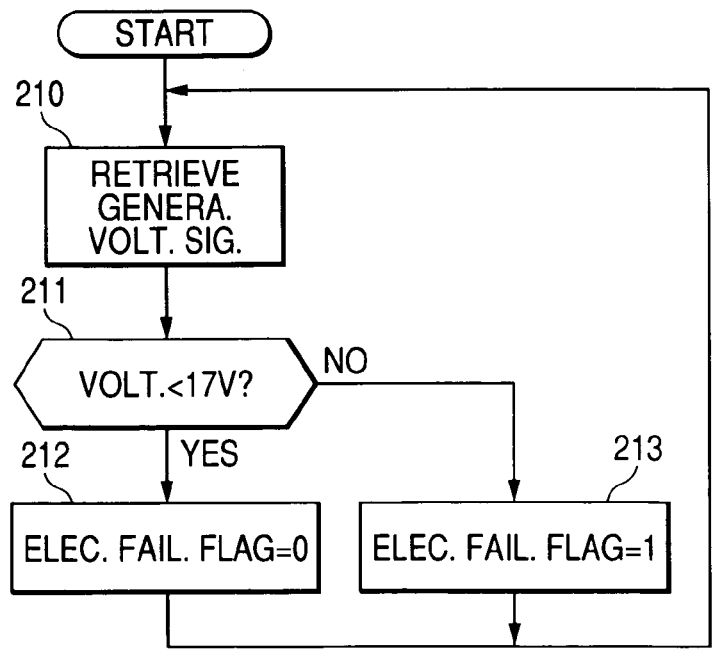
FIG. 6 is a flow chart showing a basic sequence of operations in executing a diagnosis judgment based on a generated voltage signal detected by the vehicle alternator control device.

FIG. 6 is a flow chart showing a basic sequence of operations to be executed by the DIAG judgment circuit 45 for executing the DIAG judgment based on an overvoltage based on a generated voltage signal.

First in step 210, the DIAG judgment circuit 45 retrieves the generated voltage signal delivered from the alternator status detection circuit 46. In succeeding step 211, the DIAG judgment circuit 45 makes judgment as to whether or not the output voltage of the vehicle alternator 3 is less than 17V. If, in next step 212, the output voltage is less than 17V, a positive judgment is made and an electrical failure flag is reset to "0". On the contrary, in step 213, if the output voltage is higher than 17V, a negative judgment is made and the electrical failure flag is set to "1".

Figure 7:
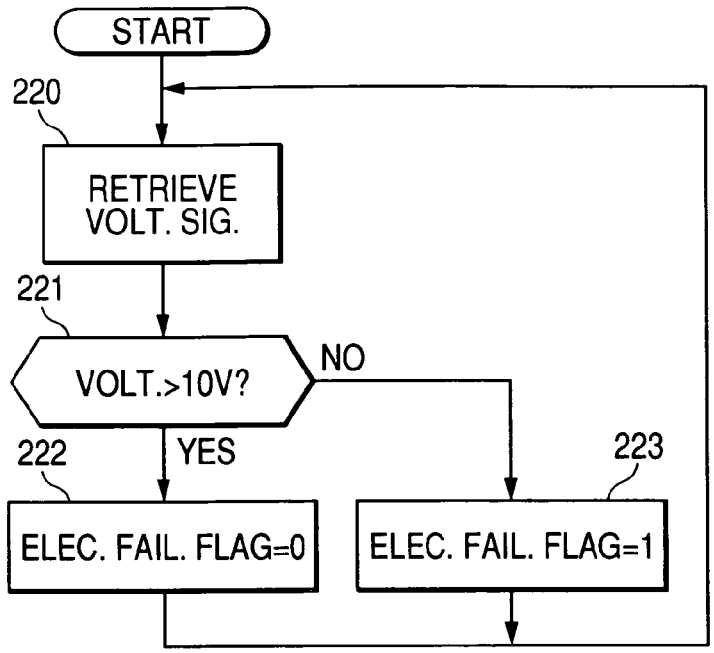
FIG. 7 is a flow chart showing a basic sequence of operations in executing a diagnosis judgment on a low voltage based on the generated voltage signal detected by the vehicle alternator control device.

FIG. 7 is a flow chart of a basic sequence of operations to be executed by the DIAG judgment circuit 45 for executing the DIAG judgment based on a low voltage in response to the generated voltage signal.

First in step 220, the DIAG judgment circuit 45 retrieves the generated voltage signal delivered from the alternator status detection circuit 46. In succeeding step 221, the DIAG judgment circuit 45 makes judgment as to whether or not the output voltage of the vehicle alternator 3 is less 10V. If, in next step 222, the output voltage is higher than 10V, a positive judgment is made and an electrical failure flag is reset to "0". On the contrary, in step 223, if the output voltage is less than 10V, a negative judgment is made and the electrical failure flag is set to "1".

Figure 8:
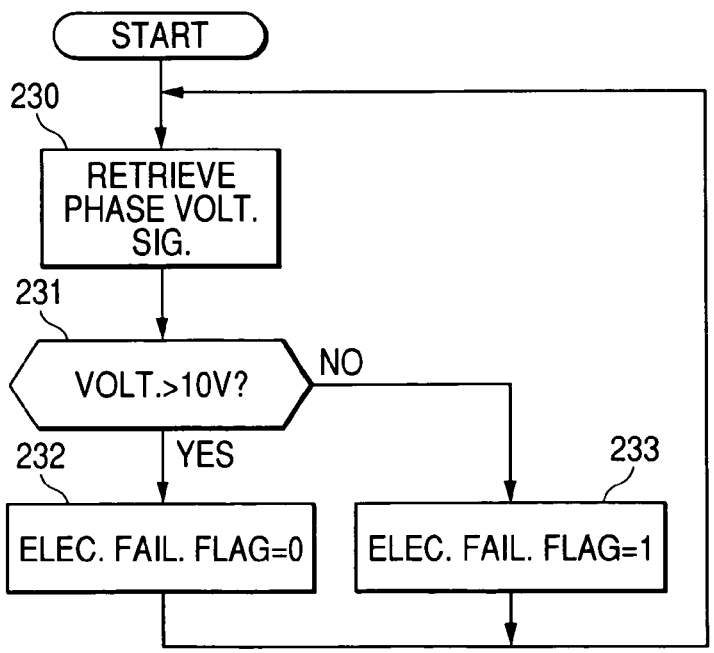
FIG. 8 is a flow chart showing a basic sequence of operations in executing a diagnosis judgment based on a phase voltage signal detected by the vehicle alternator control device.

FIG. 8 is a flow chart showing a basic sequence of operations to be executed by the DIAG judgment circuit 45 for executing the DIAG judgment based on a phase voltage of the vehicle alternator 3.

First in step 230, the DIAG judgment circuit 45 retrieves the phase voltage signal from the alternator status detection circuit 46. In succeeding step 231, the DIAG judgment circuit 45 makes judgment as to whether or not the phase voltage of the vehicle alternator 3 is less 10V. If, in next step 232, the phase voltage is found to be higher than 10V, a positive judgment is made and an electrical failure flag is reset to "0". On the contrary, in step 233, if the phase voltage is less than 10V, a negative judgment is made and the electrical failure flag is set to "1".

Figure 9:
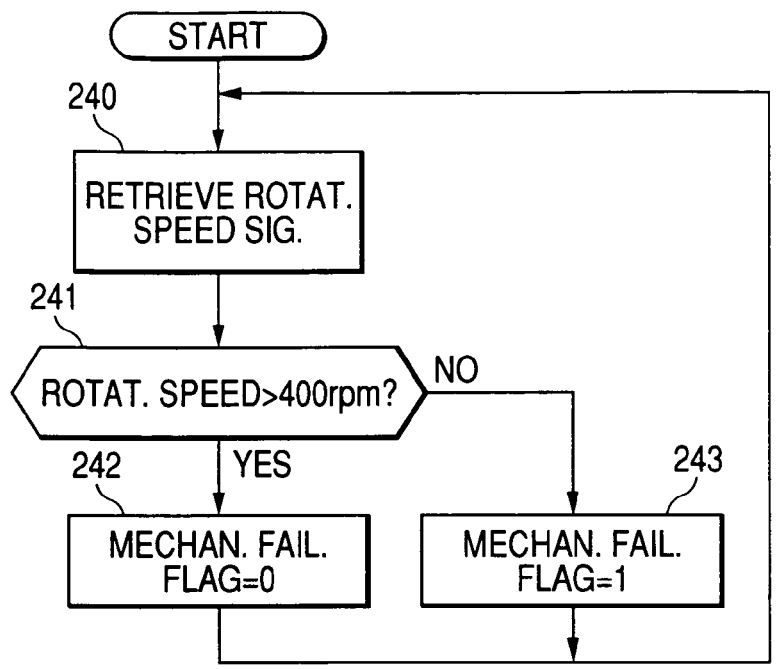
FIG. 9 is a flow chart showing a basic sequence of operations in executing a diagnosis judgment based on a rotational speed signal of the vehicle alternator detected by the vehicle alternator control device.

FIG. 9 is a flow chart showing a basic sequence of operations to be executed by the DIAG judgment circuit 45 for executing the DIAG judgment based on a rotational speed of the vehicle alternator 3.

First in step 240, the DIAG judgment circuit 45 retrieves the rotational speed signal from the alternator status detection circuit 46. In succeeding step 241, the DIAG judgment circuit 45 makes judgment as to whether or not the rotational speed of the vehicle alternator 3 is less than 400 rpm. If, in next step 242, the rotational speed is higher than 400 rpm, a positive judgment is made and a mechanical failure flag is reset to "0". On the contrary, in step 243, if the rotational speed is less than 400 rpm, a negative judgment is made and the mechanical failure flag is set to "1".

Figure 10:
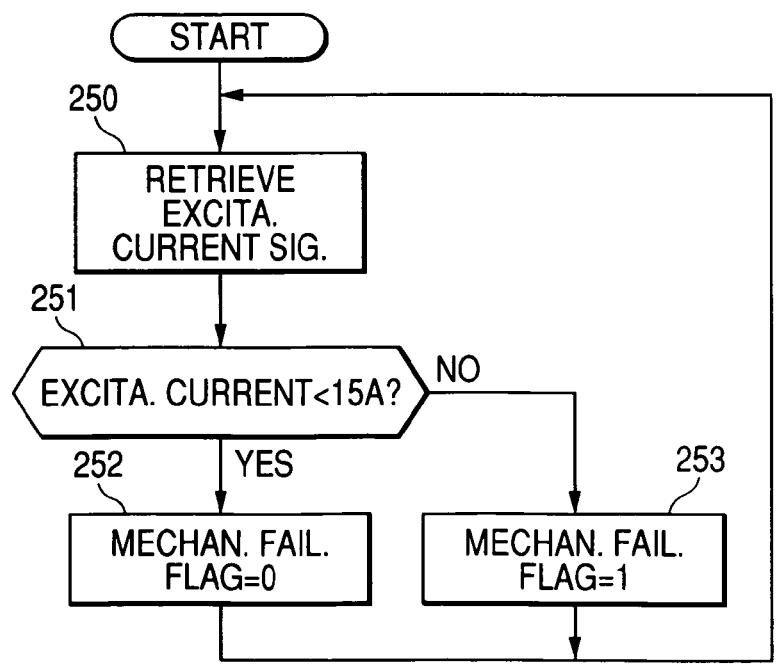
FIG. 10 is a flow chart showing a basic sequence of operations in executing a diagnosis judgment based on an excitation current signal detected by the vehicle alternator control device.

FIG. 10 is a flow chart showing a basic sequence of operations to be executed by the DIAG judgment circuit 45 for executing the DIAG judgment based on excitation current flowing through the winding of the vehicle alternator 3.

First in step 250, the DIAG judgment circuit 45 retrieves the excitation current signal from the alternator status detection circuit 46. In succeeding step 251, the DIAG judgment circuit 45 makes judgment as to whether or not excitation current of the vehicle alternator 3 is less than 15A. If, in step 252, excitation current of the vehicle alternator 3 is less than 15A, a positive judgment is made and a mechanical failure flag is reset to "0". On the contrary, in step 253, if excitation current of the vehicle alternator 3 is higher than 15A, a negative judgment is made and the mechanical failure flag is set to "1".

Figure 11:
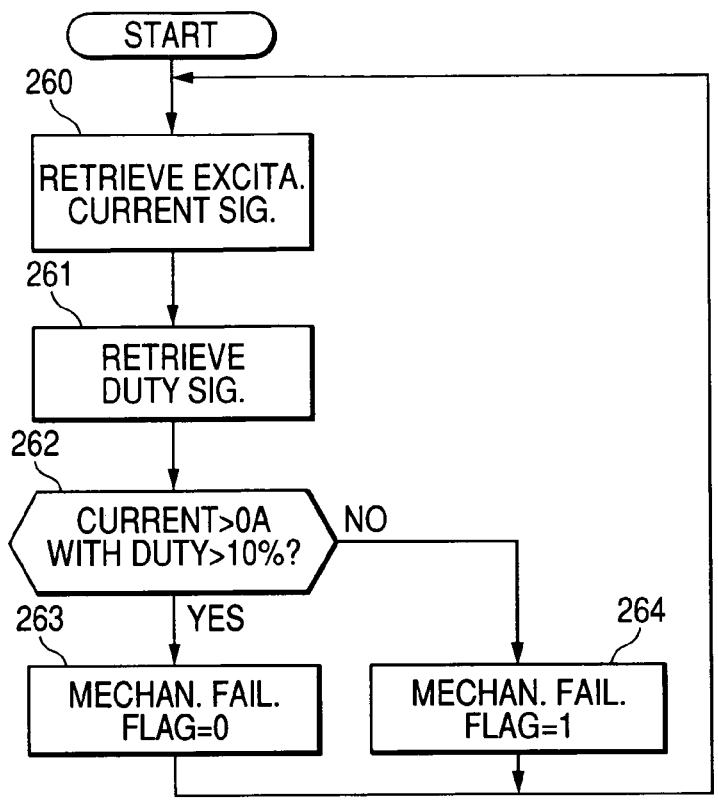
FIG. 11 is a flow chart showing a basic sequence of operations in executing a diagnosis judgment based on the excitation current signal and a duty signal detected by the vehicle alternator control device.

FIG. 11 is a flow chart showing a basic sequence of operations to be executed by the DIAG judgment circuit 45 for executing the DIAG judgment based on the excitation current signal and the duty signal.

First in steps 260 and 261, the DIAG judgment circuit 45 retrieves the excitation current signal and the duty signal from the alternator status detection circuit 46. In succeeding step 262, the DIAG judgment circuit 45 makes judgment as to whether or not excitation current of the vehicle alternator 3 is higher than 0A when the duty cycle of the transistor 100 for driving excitation current applied to the vehicle alternator 3 is higher than 10%. If, in step 263, such a condition is satisfied, a positive judgment is made and a mechanical failure flag is reset to "0". On the contrary, in step 264, if no such a condition is satisfied, a negative judgment is made and the mechanical failure flag is set to "1".

Figure 12:
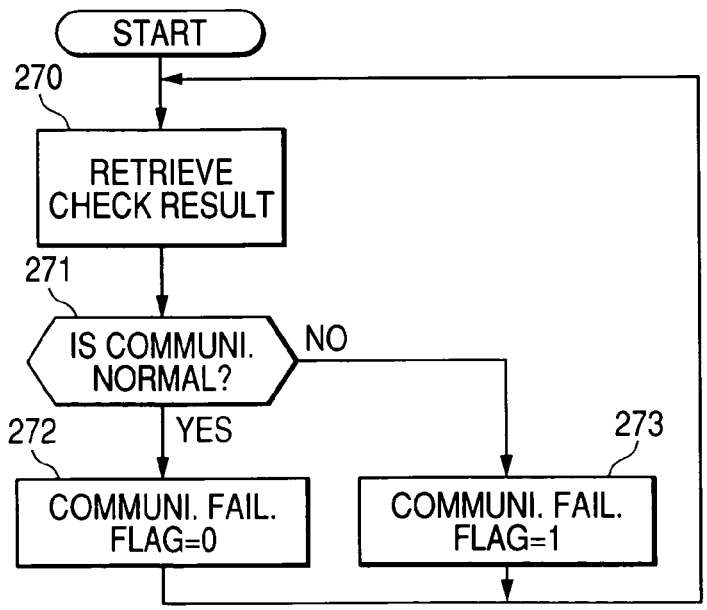
FIG. 12 is a flow chart showing a basic sequence of operations in executing a diagnosis judgment on the presence of or absence of a failure in communication executed between the vehicle alternator control device and the ECU.

FIG. 12 is a flow chart showing a basic sequence of operations to be executed by the DIAG judgment circuit 45 for executing the DIAG judgment related to a communication failure.

First in step 270, the DIAG judgment circuit 45 retrieves a checked result (that is, a corrigenda judgment result on communication data resulting from data stored in a check region) on received data from the serial communication circuit 13. In succeeding step 271, the DIAG judgment circuit 45 makes judgment as to whether or not communication is normally executed. If, in step 272, no communication failure is present, a positive judgment is made and a communication failure flag is reset to "0". On the contrary, in step 273, if the communication failure is present, a negative judgment is made and the communication failure flag is set to "1".

With the various judgments executed in such ways set forth above, the DIAG judgment circuit 45 of the vehicle alternator control device 1 executes judgment depending on a variety of vehicle statuses as to whether or not electrical and mechanical failures occur upon which various diagnosis flags reflecting the judgment results are set on.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A vehicle alternator failure monitoring system for monitoring an operational failure of a vehicle alternator, the vehicle alternator failure monitoring system comprising:

an external control device operative to perform processing depending on a power generation status of the vehicle alternator; and a vehicle alternator control device controlling a generated voltage of the vehicle alternator at a given level and operative to transmit a serial communication signal representing the power generation status of the vehicle alternator to the external control device over a serial communication;

wherein the vehicle alternator control device comprises power generation status signal transmission means operative to transmit the serial communication signal in at least two transmission modes including a first power generation status signal transmission mode to transmit a first data representing a first content of the power generation status of the vehicle alternator and a failure flag indicative of the presence of or absence of the operational failure of the vehicle alternator and a second power generation status signal transmission mode to transmit a second data representing a second content of the power generation status of the vehicle alternator.

2. The vehicle alternator failure monitoring system according to claim 1, wherein:

the vehicle alternator control device comprises:

power generation status storage means for storing the first and second data to be transmitted to the external control device as the serial communication signal; and alternator failure judgment means operative to make judgment on the presence of or absence of the operational failure of the vehicle alternator;

wherein if the alternator failure judgment means makes judgment that the operational failure of the vehicle alternator has occurred, the power generation status storage means is disenabled to write the first and second data and holds data representing a power generation status appearing in the occurrence of the operational failure.

3. The vehicle alternator failure monitoring system according to claim 1, wherein:

the external control device is operative to send a transmission request to the vehicle alternator control device for transmission of the serial communication signal on the second data upon specifying the second power generation status signal transmission mode when an occurrence of the operational failure is judged based on the failure flag contained in the serial communication signal transmitted in the first power generation status signal transmission mode.

4. The vehicle alternator failure monitoring system according to claim 2, wherein:

the power generation status signal transmission means is operative to transmit the first data including the failure flag representing the presence of the operational failure in the first power generation status signal transmission mode and, subsequently, transmit the second data in the second power generation status signal transmission mode after which the first power generation status signal transmission mode is restored again with a state in which the power generation status storage means restarts writing the first and second data.

5. The vehicle alternator failure monitoring system according to claim 1, wherein:

the first power generation status signal transmission mode has a data volume less than that of the second power generation status signal transmission mode.

6. The vehicle alternator failure monitoring system according to claim 1, wherein:

the external control device is operative to make judgment on the presence of or absence of a notification regarding the operational failure of the vehicle alternator depending on the second data, received in the second power generation status signal transmission mode with the occurrence of the operational failure of the vehicle alternator, and a vehicle status information representing a vehicle status appearing at a time point of the occurrence of the operational failure related to the vehicle alternator.

7. The vehicle alternator failure monitoring system according to claim 1, wherein:

the power generation status signal transmission means comprises communication data register means for storing the first and second data to be transmitted, and serial communication transmission means operative to transmit the serial communication signal using one of the first and second data stored in the communication data register means.

8. The vehicle alternator failure monitoring system according to claim 2, wherein:

the power generation status storage means comprises first power generation status signal storage means for storing the first data to be transmitted to the external control device in the first power generation status signal transmission mode, and second power generation status signal storage means for storing the second data to be transmitted to the external control device in the second power generation status signal transmission mode.

9. The vehicle alternator failure monitoring system according to claim 2, wherein:

the vehicle alternator control device further comprises:

power generation status detection means for detecting operating parameters of the vehicle alternator as functions related to the power generation status for use in controlling the generated voltage of the vehicle alternator at the given level;

wherein the alternator failure judgment means makes judgment on the presence of or absence of the occurrence of the operational failure of the vehicle alternator depending on the operating parameters of the vehicle alternator.

10. The vehicle alternator failure monitoring system according to claim 9, wherein:

the vehicle alternator control device further comprises:

diagnosis judgment means operative to diagnose the occurrence of the operational failure of the vehicle alternator depending on the operating parameters detected by the power generation status detection means for setting on the failure flag in the serial communication signal when the occurrence of the operational failure is diagnosed while canceling the failure flag from the serial communication signal during normal operation of the vehicle alternator.

11. The vehicle alternator failure monitoring system according to claim 1, wherein:

the external control device comprises:

serial communication receiver means for receiving the serial communication signal from the vehicle alternator control device;

diagnosis judgment means for providing a first diagnosis result, representing the presence of the operational failure of the vehicle alternator, and a second diagnosis result, representing the absence of the operational failure of the vehicle alternator, depending on the power generation status of the vehicle alternator;

ID determination means for determining one of first and second specified IDs in response to the first and second diagnosis results for use in a transmission request to be transmitted to the vehicle alternator control device; and serial communication transmission means for sending the transmission request with the one of first and second specified IDs to the vehicle alternator control device.

12. The vehicle alternator failure monitoring system according to claim 11, wherein:

the power generation status signal transmission means comprises:

power generation status detection means for detecting operating parameters of the vehicle alternator as functions related to the power generation status for use in controlling the generated voltage of the vehicle alternator at the given level;

selector means for selecting one of the first and second power generation status signal transmission modes in response to the one of first and second specified IDs delivered from the external control device; and serial communication transmission means for transmitting selected one of the first and second power generation status signal transmission modes to the serial communication receiver means of the external control device.

13. The vehicle alternator failure monitoring system according to claim 12, wherein:

the power generation status signal transmission means further comprises;

diagnosis judgment means for setting the failure flag in response to the occurrence of the operational failure of the vehicle alternator;

power generation status storage means for storing the first and second data to be transmitted to the external control device as the serial communication signal;

write permit circuit means for permitting or inhibiting writing of the first and second data into the power generation status storage means in response to the failure flag set by the diagnosis judgment means.

14. The vehicle alternator failure monitoring system according to claim 1, wherein:

the first data of the serial communication signal to be transmitted in the first power generation status signal transmission mode includes a first ID, the first content of the power generation status containing a minimal number of operating parameters of the vehicle alternator and a result of a diagnosis on the operational failure of the vehicle alternator; and the second data of the serial communication signal to be transmitted in the second power generation status signal transmission mode includes a second ID and the second content of the power generation status containing further operating parameters in addition to the first content of the power generation status.

15. A method of monitoring an operational failure of a vehicle alternator, the method comprising:

preparing an external control device operative to perform processing depending on a power generation status of the vehicle alternator;

preparing a vehicle alternator control device controlling a generated voltage of the vehicle alternator at a given level and operative to transmit a serial communication signal representing the power generation status of the vehicle alternator to the external control device over a serial communication; and transmitting one of the first and second serial communication signals in at least two transmission modes including a first power generation status signal transmission mode and a second power generation status signal transmission mode;

wherein the first serial communication signal includes a first data representing a first content of the power generation status of the vehicle alternator and a failure flag indicative of the presence of or absence of the operational failure of the vehicle alternator; and the second serial communication signal includes a second data representing a second content of the power generation status of the vehicle alternator.

16. The method of monitoring the operational failure according to claim 15, further comprising:

detecting operating parameters of the vehicle alternator as the power generation status of the vehicle alternator;

storing data representing the power generation status of the vehicle alternator in storage means;

making judgment on the presence of or absence of the operational failure of the vehicle alternator; and interrupting the storing data, when the judgment is made that the operational failure is present, while holding data representing the power generation status detected in the presence of the operational failure.

17. The method of monitoring the operational failure according to claim 15, further comprising:

allowing the external control device to send a transmission request to the vehicle alternator control device for transmission of the second data upon specifying the second power generation status signal transmission mode in the presence of the operational failure in the first data of the first serial communication signal transmitted in the first power generation status signal transmission mode.

18. The method of monitoring the operational failure according to claim 16, wherein the transmitting one of the first and second serial communication signals in at least two transmission modes comprising:

transmitting the first serial communication signal with the first data, including a failure flag indicative of the presence of the operational failure of the vehicle alternator, to the external control device in the first power generation status signal transmission mode;

subsequently transmitting the second serial communication signal with the second data to the external control device in the second power generation status signal transmission mode; and restarting the storing data representing the power generation status of the vehicle alternator in the storage means when the first power generation status signal transmission mode is restored again.

19. The method of monitoring the operational failure according to claim 15, wherein:

the external control device operates to make judgment on the presence of or absence of a notification regarding the operational failure of the vehicle alternator depending on the second data, received in the second power generation status signal transmission mode with the occurrence of the operational failure of the vehicle alternator, and a vehicle status information representing a vehicle status appearing at a time point of the occurrence of the operational failure related to the vehicle alternator.

* * * * *